United States Patent
Kondo et al.

(10) Patent No.: US 8,063,884 B2
(45) Date of Patent: Nov. 22, 2011

(54) INFORMATION PROCESSING APPARATUS, DISPLAY CONTROL METHOD, AND PROGRAM FOR CONTROLLING A DISPLAY OF THE INFORMATION PROCESSING APPARATUS BASED ON AN INPUT RECEIVED FROM A REMOTE CONTROLLER

(75) Inventors: Hirohito Kondo, Kanagawa (JP); Akari Hoshi, Tokyo (JP); Satoshi Akagawa, Tokyo (JP); Tomohiro Tsuyuhara, Kanagawa (JP); Zhezhu Jin, Saitama (JP)

(73) Assignee: Sony Corporation, Tokyo (JP)

( * ) Notice: Subject to any disclaimer, the term of this patent is extended or adjusted under 35 U.S.C. 154(b) by 962 days.

(21) Appl. No.: 11/953,354

(22) Filed: Dec. 10, 2007

(65) Prior Publication Data

US 2008/0192003 A1 Aug. 14, 2008

(30) Foreign Application Priority Data

Dec. 27, 2006 (JP) ................................. 2006-353198

(51) Int. Cl.
*G06F 3/02* (2006.01)
*G06F 3/048* (2006.01)
*G09G 5/00* (2006.01)
*H04N 5/44* (2011.01)
*H04B 1/06* (2006.01)

(52) U.S. Cl. ........ 345/172; 345/156; 345/168; 348/734; 455/352; 715/783; 715/831

(58) Field of Classification Search .......... 345/156–157, 345/160, 168–169, 172; 348/734; 455/352; 715/781, 783, 790, 793, 797, 802, 814, 827, 715/831, 844

See application file for complete search history.

(56) References Cited

U.S. PATENT DOCUMENTS

| 5,990,890 | A | * | 11/1999 | Etheredge | 715/808 |
| 6,064,368 | A | * | 5/2000 | Kang | 345/158 |
| 6,202,212 | B1 | * | 3/2001 | Sturgeon et al. | 725/141 |
| 6,571,299 | B1 | * | 5/2003 | Schroyer et al. | 710/6 |
| 7,477,233 | B2 | * | 1/2009 | Duncan et al. | 345/156 |
| 7,562,309 | B2 | * | 7/2009 | Matthews et al. | 715/827 |
| 7,821,419 | B2 | * | 10/2010 | Hayes et al. | 340/825.76 |
| 2005/0055647 | A1 | * | 3/2005 | Chen | 715/827 |

FOREIGN PATENT DOCUMENTS

| JP | 5-119956 | 5/1993 |
| JP | 5-197466 | 8/1993 |
| JP | 2000-089892 | 3/2000 |

* cited by examiner

*Primary Examiner* — Bipin Shalwala
*Assistant Examiner* — Keith Crawley
(74) *Attorney, Agent, or Firm* — Oblon, Spivak, McClelland, Maier & Neustadt, L.L.P.

(57) ABSTRACT

An information processing apparatus that allows a display to show a plurality of windows on a same screen is disclosed. The information processing apparatus includes: a detecting means for detecting a signal sent in response to a press of a button allocated on a remote controller; a control means for outputting to an operating system a signal indicating that a first key and a second key provided on a keyboard are pressed and allowing the operating system to switch a representation on the display when the detecting means detects that a first button provided on the remote controller is pressed in accordance with a state of the representation on the display; and a measuring means for measuring a time period from the detection of a signal corresponding to the press of the first button.

11 Claims, 13 Drawing Sheets

INFORMATION PROCESSING APPARATUS, DISPLAY CONTROL METHOD, AND PROGRAM FOR CONTROLLING A DISPLAY OF THE INFORMATION PROCESSING APPARATUS BASED ON AN INPUT RECEIVED FROM A REMOTE CONTROLLER

CROSS REFERENCES TO RELATED APPLICATIONS

The present invention contains subject matter related to Japanese Patent Application JP 2006-353198 filed in the Japanese Patent Office on Dec. 27, 2006, the entire contents of which being incorporated herein by reference.

BACKGROUND OF THE INVENTION

1. Field of the Invention

The present invention relates to an information processing apparatus, a display control method, and a program, particularly to an information processing apparatus, a display control method, and a program, in which a single one of buttons provided on a remote controller is used to do the same manipulations as a plurality of manipulations done by using keys provided on a keyboard.

2. Description of the Related Art

In recent years, a personal computer mounted with an AV (Audio Visual) function is popular. Among personal computers, some of them have a remote controller as an accessory as similar to AV appliances such as a television receiver and a hard disk recorder.

A user uses the remote controller to switch the channels of television programs displayed on the personal computer, or to adjust the volume of music to be reproduced on the personal computer.

JP-A-5-119956 (Patent Reference 1) discloses a technique in which the screen representation of a program currently run on an OS (Operating System) is switched.

SUMMARY OF THE INVENTION

The manipulations of personal computers are considered based on the manipulations through a keyboard. From the viewpoint of the size of a casing, it is difficult to provide dedicated buttons on a remote controller for individual manipulations, such manipulations done by combining multiple keys, for example, one key is pressed while a Shift key provided on a keyboard is being pressed.

Therefore, in order to allow manipulations as many as possible by a remote controller, it can be considered that a single one of buttons is pressed to do a plurality of manipulations that is allowed by using a keyboard.

Thus, it is desirable to use a single one of buttons provided on a remote controller to do the same manipulations as a plurality of manipulations done by using keys provided on a keyboard.

Particularly, it is desirable to readily use certain functions as similar to using a keyboard in the case in which a remote controller is used for manipulating a device that is mounted with an OS such as Windows XP (trademark) and has the functions as a personal computer.

An information processing apparatus according to an embodiment of the invention is an information processing apparatus that allows a display to show a plurality of windows on a same screen, the information processing apparatus including: a detecting means for detecting a signal sent in response to a press of a button allocated on a remote controller; a control means for outputting to an operating system a signal indicating that a first key and a second key provided on a keyboard are pressed and allowing the operating system to switch a representation on the display when the detecting means detects that a first button provided on the remote controller is pressed in accordance with a state of the representation on the display; and a measuring means for measuring a time period from the detection of a signal corresponding to the press of the first button.

In the information processing apparatus according to the embodiment of the invention, within a predetermined time period after the signal corresponding to the press of the first button is detected, the control means may continuously output to the operating system a signal indicating that the first key is kept pressed.

In the information processing apparatus according to the embodiment of the invention, when a signal from the remote controller is not detected within the predetermined time period, the control means may output a signal indicating that the first key is released.

In the information processing apparatus according to the embodiment of the invention, when a signal corresponding to a press of the first button is again detected within the predetermined time period, the control means may output a signal indicating that the second key is pressed while the first key is kept pressed.

In the information processing apparatus according to the embodiment of the invention, when the detecting means detects that the first button is pressed, the control means may output to the operating system a signal indicating that an Alt key and a Tab key provided on the keyboard are pressed.

In the information processing apparatus according to the embodiment of the invention, when a signal corresponding to a press of a second button provided on the remote controller is detected within the predetermined time period, the control means may output a signal that moves a cursor in a menu to select an active window.

In the information processing apparatus according to the embodiment of the invention, when a signal corresponding to a press of a third button provided on the remote controller is detected within the predetermined time period, the control means may output a signal that determines an item in a menu to select an active window.

In the information processing apparatus according to the embodiment of the invention, when a signal corresponding to a press of a fourth button provided on the remote controller is detected within the predetermined time period, the control means may output to the operating system a signal indicating that the Alt key and a F4 key of function keys provided on the keyboard are pressed to finish a window displayed on the frontmost side.

An information processing method or a program according to another embodiment of the invention is an information processing method of switching to an active window from a plurality of windows or a program that allows a computer to execute a process, the method or the program including the steps of: detecting a signal sent in response to a press of a button allocated on a remote controller; outputting to an operating system a signal indicating that a first key and a second key provided on a keyboard are pressed and allowing the operating system to switch a representation on a display in accordance with a state of the representation on the display when it is detected that a first button provided on the remote controller is pressed; and measuring a time period from the detection of a signal corresponding to the press of the first button.

In the method according to the embodiment of the invention, within a predetermined time period after the signal corresponding to the press of the first button is detected, in the control step, a signal indicating that the first key is kept pressed may be continuously outputted to the operating system.

In the method or the program according to the embodiment of the invention, when a signal from the remote controller is not detected within the predetermined time period, in the control step, a signal indicating that the first key is released may be outputted.

In the method or the program according to the embodiment of the invention, when a signal corresponding to a press of the first button is again detected within the predetermined time period, in the control step, a signal indicating that the second key is pressed while the first key is kept pressed may be outputted.

According to the embodiment of the invention, a user uses a single one of buttons provided on a remote controller to perform a plurality of manipulations the same as manipulations done by using keys provided on a keyboard.

PREFERRED EMBODIMENTS OF THE INVENTION

Figure 1:
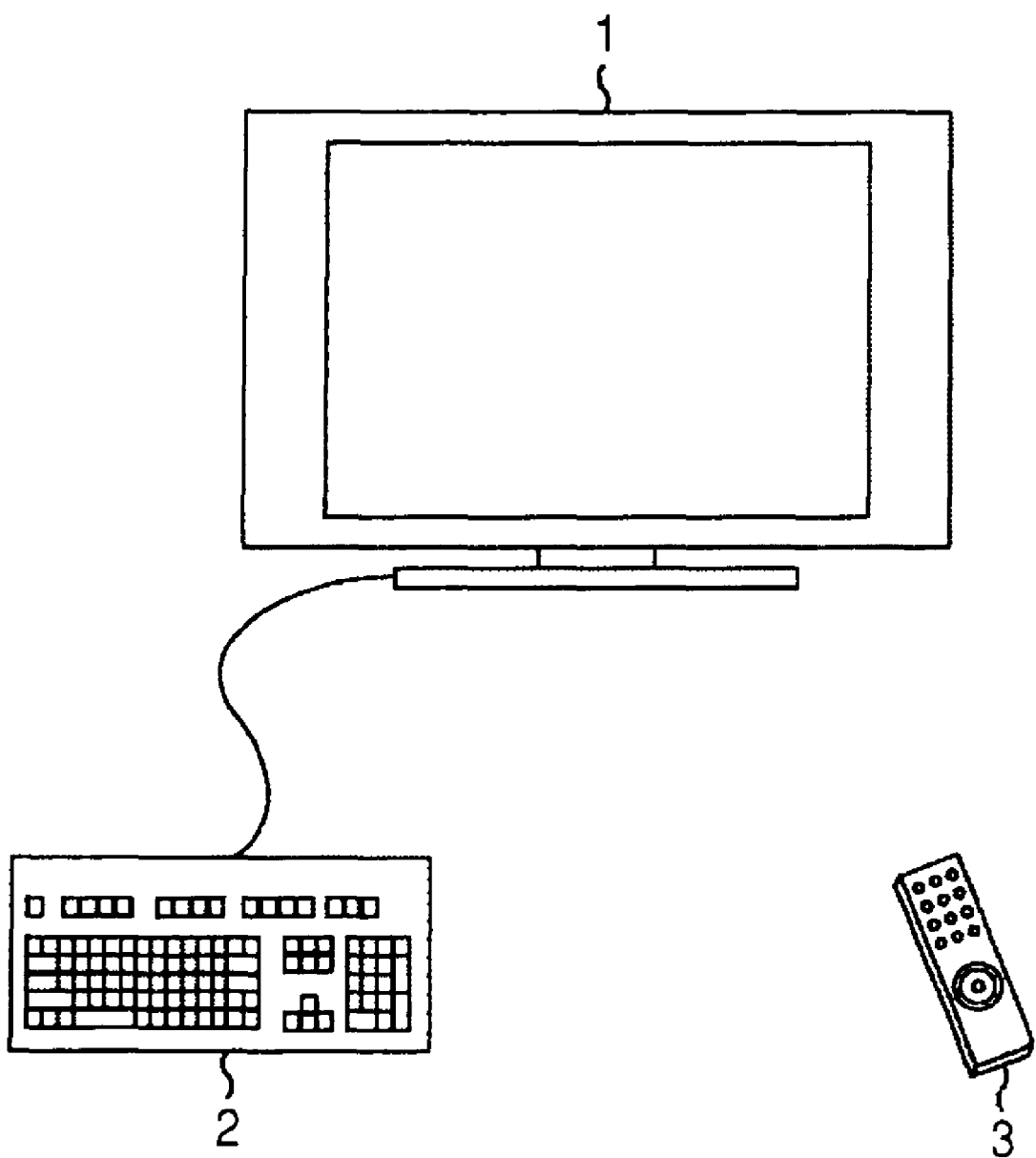
FIG. 1 shows a diagram depicting an exemplary information processing apparatus according to an embodiment of the invention.

Hereinafter, embodiments of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

An information processing apparatus according to one embodiment of the invention is an information processing apparatus (for example, an information processing apparatus 1 shown in FIG. 1) that allows a display to show a plurality of windows on a same screen, the information processing apparatus including: a detecting means (for example, a manipulation detecting part 111 shown in FIG. 10) for detecting a signal sent in response to a press of a button allocated on a remote controller; a control means (for example, a signal generating part 112 shown in FIG. 10) for outputting to an operating system a signal indicating that a first key and a second key provided on a keyboard are pressed and allowing the operating system to switch a representation on the display when the detecting means detects that a first button provided on the remote controller is pressed in accordance with a state of the representation on the display; and a measuring means (for example, the signal generating part 112 shown in FIG. 10) for measuring a time period from the detection of a signal corresponding to the press of the first button.

An information processing method or a program according to another embodiment of the invention is an information processing method of switching to an active window from a plurality of windows or a program that allows a computer to execute a process, the method or the program including the steps of: detecting a signal sent in response to a press of a button allocated on a remote controller; outputting to an operating system a signal indicating that a first key and a second key provided on a keyboard are pressed and allowing the operating system to switch a representation on a display in accordance with a state of the representation on the display when it is detected that a first button provided on the remote controller is pressed (for example, Step S3 in FIG. 11); and measuring a time period from the detection of a signal corresponding to the press of the first button.

Hereinafter, the embodiments of the invention will be described with reference to the drawings.

FIG. 1 shows a diagram depicting an exemplary information processing apparatus 1 according to an embodiment of the invention.

As shown in FIG. 1, the information processing apparatus 1 is a television receiver. The information processing apparatus 1 is mounted with an OS typified by Windows XP (trademark), and has functions as a personal computer.

To the information processing apparatus 1, a keyboard 2 is connected through a USB (Universal Serial Bus) cable. A user manipulates keys provided on the keyboard 2 to write text by using an application such as a text editor run on the OS, or to browse Web sites by using a Web browser. For example, the keyboard 2 is a QWERTY arrangement keyboard, on which an Alt key, a Tab key, an Enter key, and up, down, right and left keys are provided.

In addition, the information processing apparatus 1 is provided with a remote controller 3, and a user manipulates the remote controller 3 to switch the channels of television programs shown on the display of the information processing apparatus 1, or to control the volume outputted from a speaker.

The remote controller 3 is provided with buttons that a single one of the buttons is pressed to implement a plurality of manipulations done by using the keys provided on the keyboard 2.

For example, a user presses a single one of the buttons to show an application switching menu on the display the same as that shown when pressing the Alt key and the Tab key provided on the keyboard 2.

The application switching menu is a menu that is used when a window desired to turn into the active state is switched among windows shown by operating applications. The window in the active state is a window that is shown on the frontmost side and is in the state in which a user manipulates the keyboard 2 or the remote controller 3 for work thereon.

In addition, the user repeatedly presses a single one of the buttons provided on the remote controller 3 to select the window desired to turn into the active state, which can be selected by pressing the Tab key while the Alt key provided on the keyboard 2 is being pressed.

In other words, in this example, it is configured in which a single one of buttons provided on the remote controller 3 is manipulated to allow two types of manipulations: the manipulation that can be done by pressing the Alt key and the Tab key provided on the keyboard 2, and the manipulation that can be done by pressing the Tab key while the Alt key is being pressed.

Figure 2:
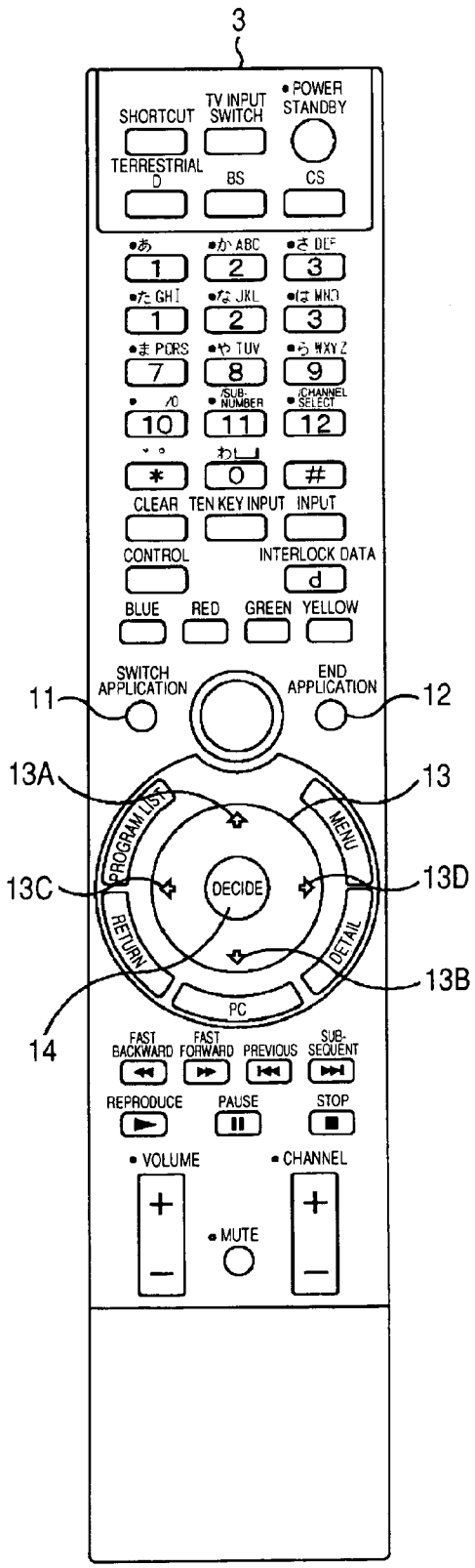
FIG. 2 shows a diagram depicting an exemplary appearance of a remote controller.

FIG. 2 shows a diagram depicting an exemplary appearance of the remote controller 3.

The remote controller 3 is provided with an application switching button 11 and an application end button 12, in addition to a power button manipulated when the power source of the information processing apparatus 1 is turned on and off, and number buttons manipulated when a reception channel is switched.

The application switching button 11 is a dedicated button assigned to the manipulation that shows the application switching menu which can be done by pressing the Alt key and the Tab key provided on the keyboard 2, and to the manipulation that selects the window desired to turn into the active state which can be done by pressing the Tab key while the Alt key is being pressed. The application end button 12 is a button assigned to the manipulation that ends the application and closes the window.

Below the application switching button 11 and the application end button 12, a cross button 13 formed of circular members is provided. On the cross button 13, the portion printed with an upward arrow is an up button 13A, the portion printed with a downward arrow is a down button 13B, the portion printed with a leftward arrow is a left button 13C, and the portion printed with a rightward arrow is a right button 13D. On the center of the cross button 13, a decide button 14 is also provided that is manipulated when an item is decided.

As described later, it is also configured in which while the application switching menu is being shown, the left button 13C or the right button 13D is pressed to move the position of a cursor shown on the application switching menu for selecting the window desired to turn into the active state.

Figure 3:
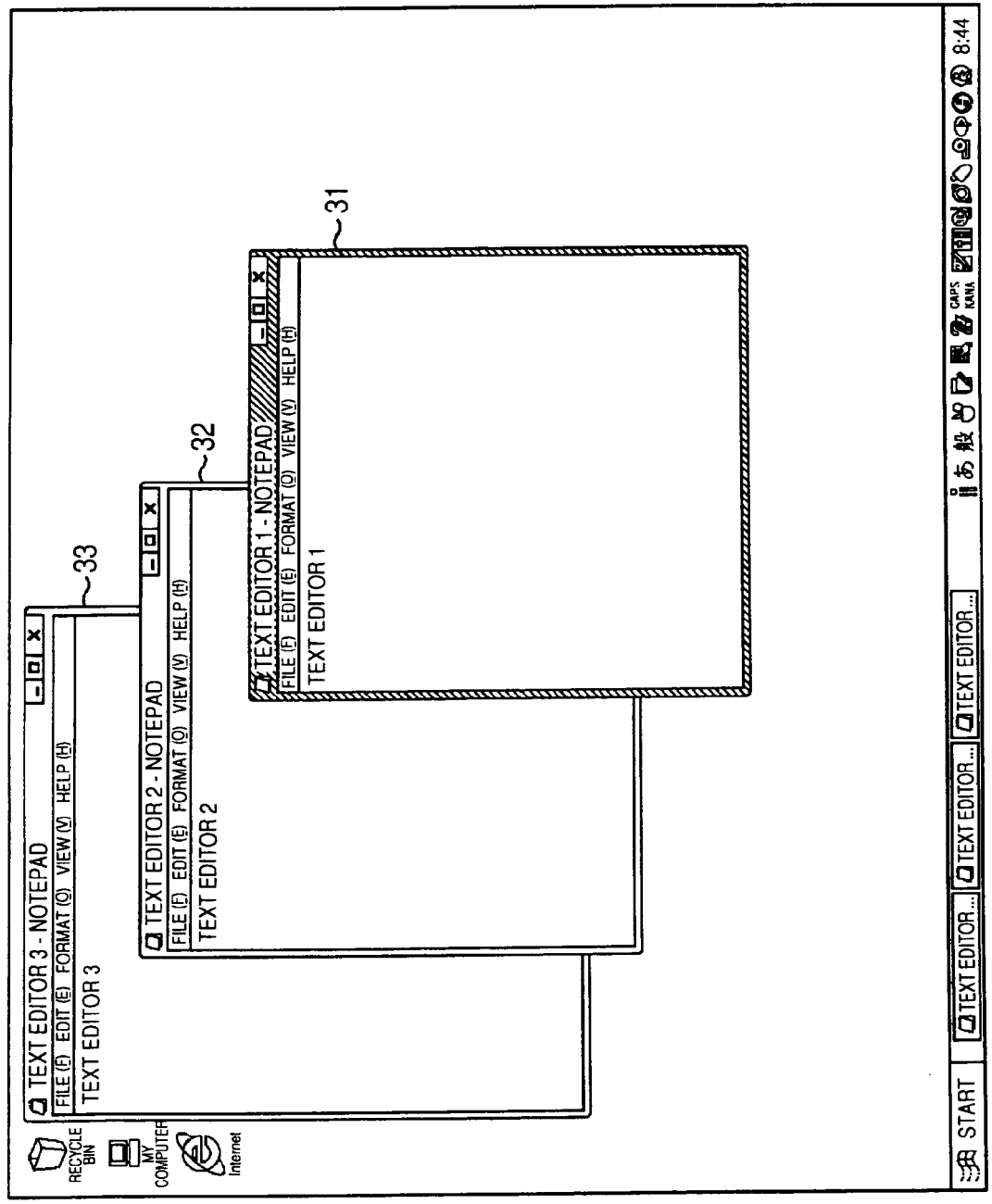
FIG. 3 shows a diagram depicting an exemplary screen shown on a display.

FIG. 3 shows a diagram depicting an exemplary screen shown on the display of the information processing apparatus 1.

FIG. 3 shows an example in which the text editor application "Notepad" (an application program) is being run, and three windows 31 to 33 are shown in the desktop screen of an OS. Only the frame of the window 31 displayed on the frontmost side is shown in a different color from those of the frames of the other windows, and in this example, the window 31 is the window in the active state. The hatched frame of the window 31 represents that the frame is shown in a different color from those of the frames of the other windows.

To the file shown by the window 31, a file name "text editor 1" is set, and its file name and the text "Notepad" are shown in the upper part of the window 31. In the text input space, the text "text editor 1" the same as the file name is inputted.

Similarly, in the window 32, a file name "text editor 2" is set to the file shown by the window 32, and its file name and the text "Notepad" are shown in the upper part of the window 32. In the text input space, the text "text editor 2" the same as the file name is inputted. To the file displayed by the window 33, a file name "text editor 3" is set, and its file name and the text "Notepad" are shown in the upper part of the window 33. In the text input space, the text "text editor 3" the same as the file name is inputted.

In the upper right part of each of the windows, a button that is manipulated when the window is scaled down, a button that is manipulated when scaled up, and a button that is manipulated when closed are displayed as well.

Figure 4:
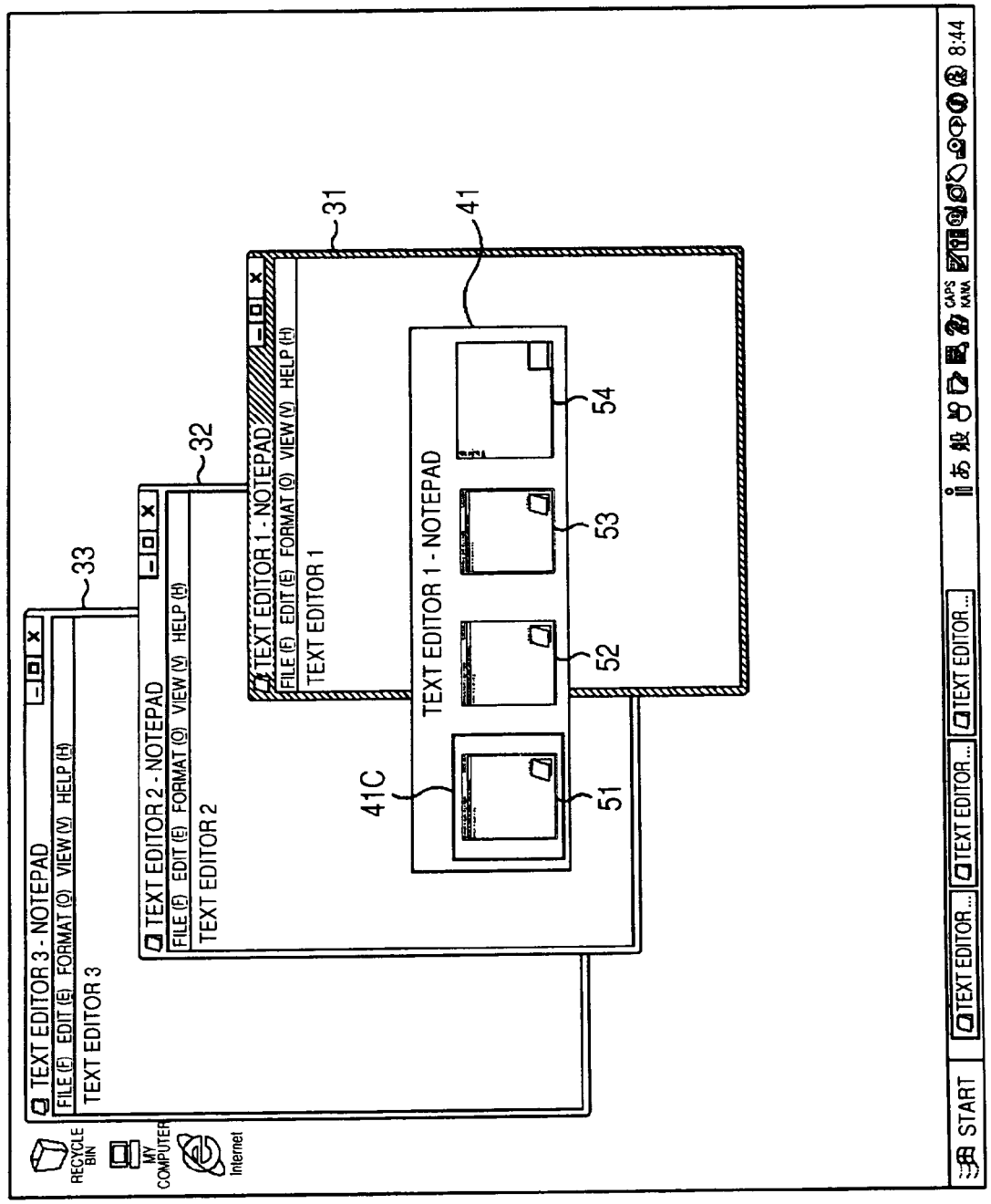
FIG. 4 shows a diagram depicting another exemplary screen shown on the display.

For example, in the case in which the application switching button 11 provided on the remote controller 3 is pressed for one time in the state in which such a screen is displayed, as shown in FIG. 4, the application switching menu 41 is shown in the almost center of the screen as overlapped with the window "Notepad".

In the example shown in FIG. 4, in the application switching menu 41, icons 51 to 54 are shown in sequence, and the icon 51 is selected by a cursor 41C among them. Above the center of the application switching menu 41, the text "text editor 1" and "Notepad" are shown the same as those shown in the upper part of the window 31 indicated by the icon 51.

The icon 51 is an icon that indicates the window 31, and the icon 52 is an icon that indicates the window 32. The icon 53 is an icon that indicates the window 33, and the icon 54 is an icon that indicates the overall desktop screen. The icons 51 to 54 are thumbnail images that the windows and the screen indicated by the icons are scaled down.

Therefore, a user can select the window desired to turn into the active state thus displayed from the application switching menu 41.

In other words, when it is detected that the application switching button 11 is pressed for one time based on a signal from the remote controller 3, the application that detects a user manipulation outputs to the OS a signal indicating that the Alt key and the Tab key provided on the keyboard 2 are pressed at the same time, and the OS shows the application switching menu 41 in response to the signal.

In the apparatus according to the embodiment mounted with an OS, when a user presses the Alt key and the Tab key provided on the keyboard at the same time, the menu used for switching the applications is displayed.

As described above, the user presses the application switching button 11 that is a single one of the buttons provided on the remote controller 3 only for one time, and then the user performs the same manipulation as the manipulation pressing the Alt key and the Tab key configuring the keyboard 2 at the same time.

Moreover, different from the Tab key and the up, down, right and left keys, the Alt key is a key that outputs a signal to the OS depending on timings when pressed or released. Therefore, in the OS, when the signal indicating that the Alt key and the Tab key provided on the keyboard 2 are pressed at the same time is supplied in response to pressing the application switching button 11, for the Alt key, the OS recognizes that the Alt key is kept pressed until a signal indicating that the Alt key is released is supplied. The Tab key and the up, down, right and left keys are keys that output signals to the OS only when pressed.

Figure 5:
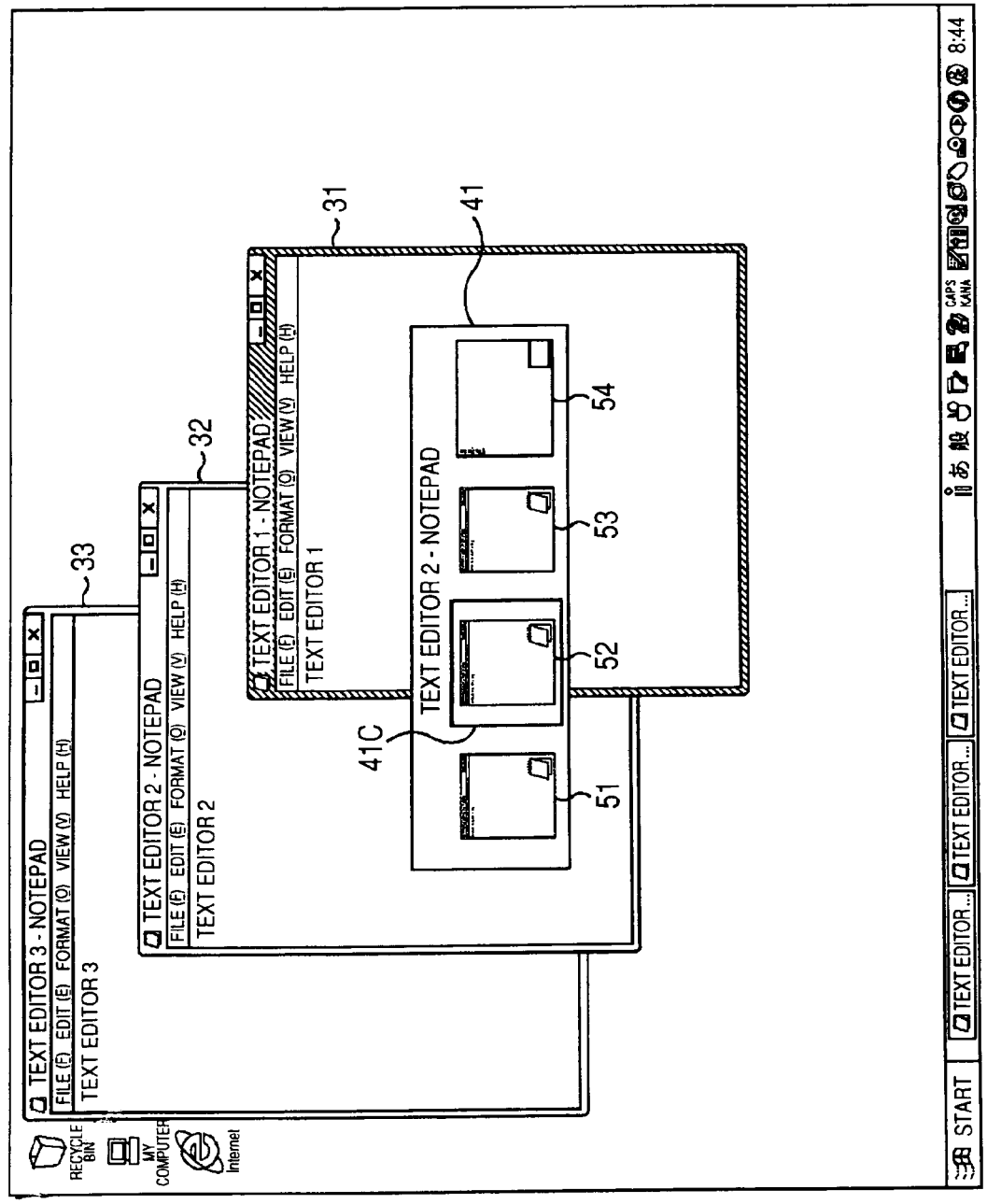
FIG. 5 shows a diagram depicting still another exemplary screen shown on the display.

FIG. 5 shows a diagram depicting an exemplary screen displayed when the application switching button 11 is pressed for one more time in the state shown in FIG. 4 in which the application switching menu 41 is shown.

In the example shown in FIG. 5, the position of the cursor 41C is moved in the right direction by one icon, and the target icon to select is switched from the icon 51 to the icon 52.

In other words, when it is detected that the application switching button 11 is pressed for one time based on the signal from the remote controller 3 in the state in which the application switching menu 41 is shown, the application that detects a user manipulation outputs to the OS a signal indicating that the Tab key provided on the keyboard 2 is pressed for one time, and the OS moves the position of the cursor 41C in the right direction in response to the signal.

In the apparatus according to the embodiment mounted with an OS, the Tab key is pressed for one time while the Alt key is being pressed in the state in which the application switching menu is shown, and then the position of the cursor displayed on the application switching menu is shown as moved in the right direction by one icon. As described above, in the OS in the information processing apparatus 1, it is recognized that the Alt key is kept pressed.

As described above, in the case in which the application switching menu 41 is shown, a user presses the application switching button 11 provided on the remote controller 3 only for one time, and thus the user can perform the same manipulation as the manipulation pressing the Tab key for one time while the user is pressing the Alt key provided on the keyboard 2.

Similarly, when the application switching button 11 is pressed for one time in the state shown in FIG. 5 in which the icon 52 is selected by the cursor 41C, the position of the cursor 41C is moved in the right direction by one icon to turn into the state in which the icon 53 is selected by the cursor 41C. In addition, when the application switching button 11 is pressed for one time in the state in which the icon 53 is selected by the cursor 41C, the position of the cursor 41C is moved in the right direction by one icon to turn into the state in which the icon 54 is selected by the cursor 41C.

When the application switching button 11 is pressed for one time in the state in which the icon 54 is selected by the cursor 41C, the position of the cursor 41C is returned to the position of the icon 51 to turn into the state in which the icon 51 is selected by the cursor 41C. As described above, a user repeatedly presses the application switching button 11 to in turn move the cursor 41C.

As described above, in the application that detects a user manipulation, when it is detected that a user presses the application switching button 11 provided on the remote controller 3, depending on the state of the display at that time, a signal indicating that one of different keys provided on the keyboard 2 is pressed is outputted to the OS, such as the signal indicating that the Alt key and the Tab key are pressed at the same time, and the signal indicating that the Tab key is pressed for one time.

Similarly, also when one of the other buttons provided on the remote controller 3 is pressed, the application that detects a user manipulation outputs a predetermined signal to the OS, and the representation on the display is correspondingly switched.

Figure 6:
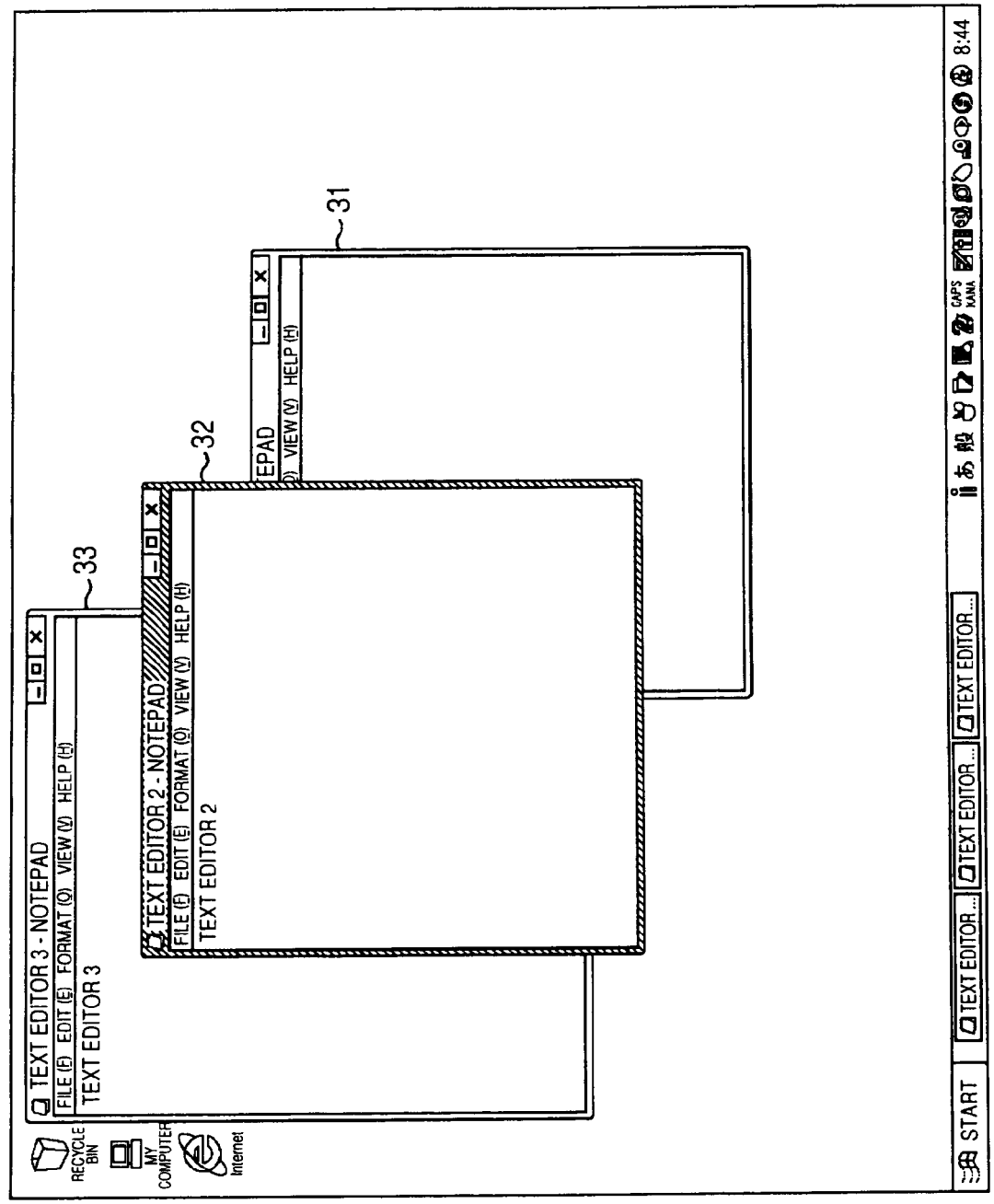
FIG. 6 shows a diagram depicting an exemplary screen shown on the display.

For example, in the case in which the decide button 14 provided on the remote controller 3 is pressed in the state shown in FIG. 5 in which the icon 52 is selected by the cursor 41C, as shown in FIG. 6, the representation of the application switching menu 41 is deleted, and the window 32 indicated by the icon 52 is shown as the window in the active state.

When it is detected that the decide button 14 is pressed based on the signal from the remote controller 3 in the state in which the application switching menu 41 is shown, the application that detects a user manipulation outputs to the OS a signal indicating that the Enter key provided on the keyboard 2 is pressed, the OS deletes the representation of the application switching menu 41 in response to the signal, and the representation is switched to turn the window indicated by the icon selected by the cursor 41C into the active state.

In the apparatus according to the embodiment mounted with an OS, when the Enter key is pressed while the Alt key is being pressed, the representation of the application switching menu is deleted, and the window indicated by the icon selected by the cursor at that time is shown as the window in the active state.

In addition, when it is detected that the left button 13C of the cross button 13 is pressed based on the signal from the remote controller 3 in the state in which the application switching menu 41 is shown, the application that detects a user manipulation outputs to the OS a signal indicating that the left key provided on the keyboard 2 is pressed, and in response to the signal, the OS moves the position of the cursor 41C in the left direction by one icon.

For example, when the left button 13C is pressed for one time in the state shown in FIG. 5 in which the icon 52 is selected by the cursor 41C, the position of the cursor 41C is moved in the left direction by one icon to return to the state shown in FIG. 4 in which the icon 51 is selected by the cursor 41C.

On the other hand, when it is detected that the right button 13D of the cross button 13 is pressed based on the signal from the remote controller 3 in the state in which the application switching menu 41 is shown, the application that detects a user manipulation outputs to the OS a signal indicating that the right key provided on the keyboard 2 is pressed, and in response to the signal, the OS moves the position of the cursor 41C in the right direction by one icon.

For example, when the right button 13D is pressed for one time in the state shown in FIG. 5 in which the icon 52 is selected by the cursor 41C, the position of the cursor 41C is moved in the right direction by one icon to turn into the state in which the icon 53 is selected by the cursor 41C.

In the apparatus according to the embodiment mounted with an OS, when a user presses the left key provided on the keyboard for one time while the Alt key is being pressed in the state in which the application switching menu is displayed, the position of the cursor displayed on the application switching menu is shown as moved in the left direction by one icon. Similarly, when a user presses the right key provided on the keyboard for one time while the Alt key is being pressed, the position of the cursor displayed on the application switching menu is shown as moved in the right direction by one icon. As described above, in the OS in the information processing apparatus 1, it is recognized that the Alt key is kept pressed.

Furthermore, when it is detected that the application end button 12 is pressed based on the signal from the remote controller 3, the application that detects a user manipulation outputs to the OS a signal indicating that the Alt key provided on the keyboard 2 and the F4 key of the function keys are pressed at the same time, and in response to the signal, the OS deletes the representation of the window displayed on the frontmost side.

For example, when the application end button 12 is pressed for one time in the state shown in FIG. 3 in which the window 31 is displayed before the windows 32 and 33, the representation of the window 31 is deleted, and the window 32 and the window 33 are shown.

In the apparatus according to the embodiment mounted with an OS, when a user presses the Alt key and the F4 key of the function keys at the same time, the representation of the window displayed on the frontmost side at that time is deleted.

A series of the process steps of the information processing apparatus 1 in which the representation on the display is switched will be described later with reference to flow charts.

Figure 7:
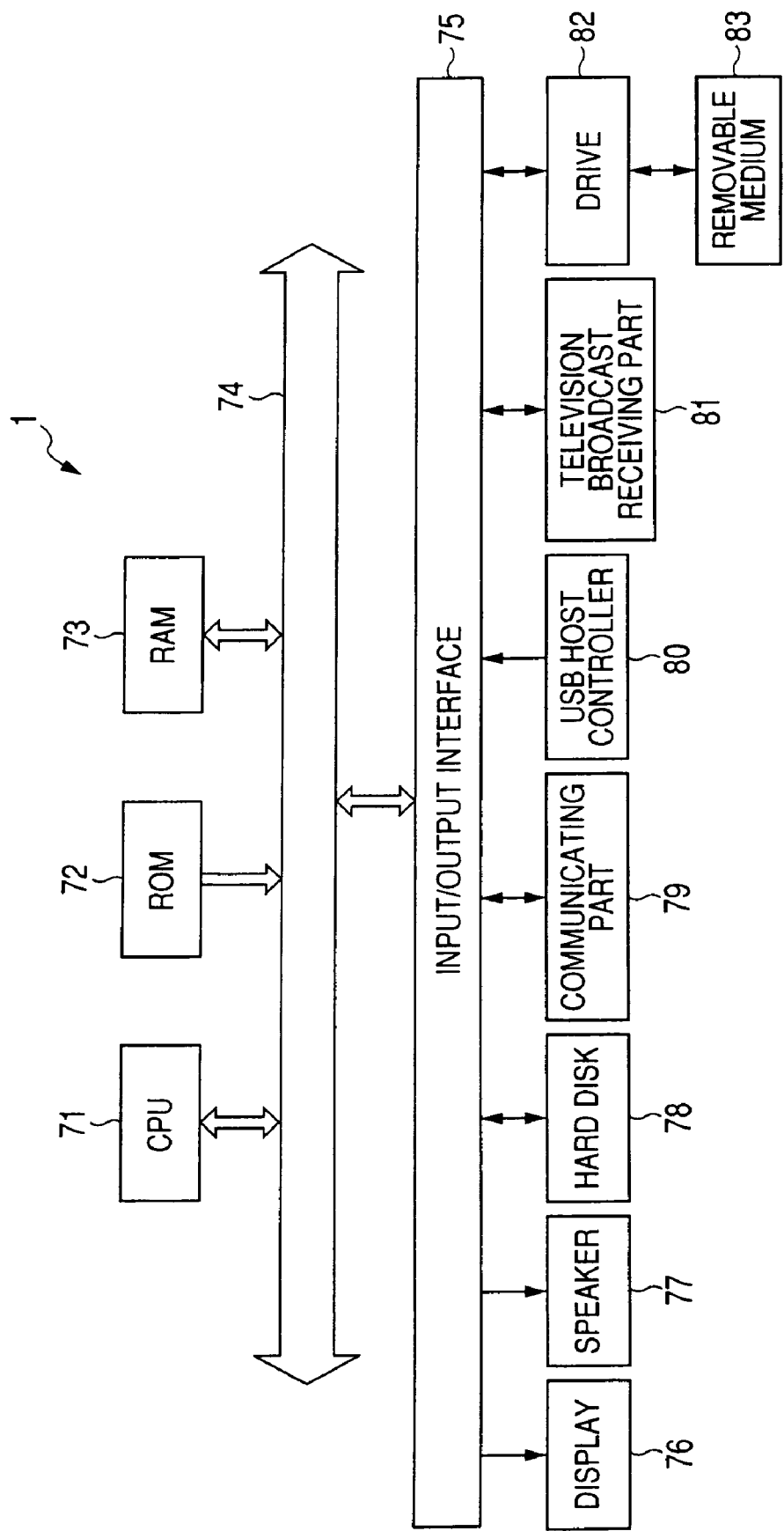
FIG. 7 shows a block diagram depicting an exemplary hardware configuration of the information processing apparatus.

FIG. 7 shows a block diagram depicting an exemplary hardware configuration of the information processing apparatus 1.

A CPU (Central Processing Unit) 71 executes various processes in accordance with programs stored in a ROM (Read Only Memory) 72, or programs loaded from a hard disk 78 to a RAM (Random Access Memory) 73. In addition, the RAM 73 stores therein data necessary to execute various processes by the CPU 71 as necessary.

The CPU 71, the ROM 72 and the RAM 73 are connected to each other through a bus 74. In addition, to the bus 74, an input/output interface 75 is also connected.

To the input/output interface 75, a display 76 formed of a LCD (Liquid Crystal Display), a speaker 77, a hard disk 78, and a communicating part 79 for communications over a network are connected.

In addition, to the input/output interface 75, a USB host controller 80, a television broadcast receiving part 81, and a drive 82 are also connected. The USB host controller 80 receives signals that are supplied from the keyboard 2 connected through a USB cable and signals from the remote controller 3 that are received in a light receiving part as a USB device connected to the USB host controller 80.

The television broadcast receiving part 81 receives signals from an antenna, not shown, receiving television broadcast waves, and acquires data of television programs broadcast on predetermined channels. The data of the television program generated in the television broadcast receiving part 81 is supplied to the display 76 through the input/output interface 75, and the data is used to show the television program, or supplied to the hard disk 78 for recording.

The drive 82 is mounted with a removable medium 83 formed of an optical disk such as a Blu-ray Disc (trademark) and a DVD (Digital Versatile Disc). The drive 82 reads a computer program out of the removable medium 83, and the program is installed in the hard disk 78 as necessary.

Figure 8:
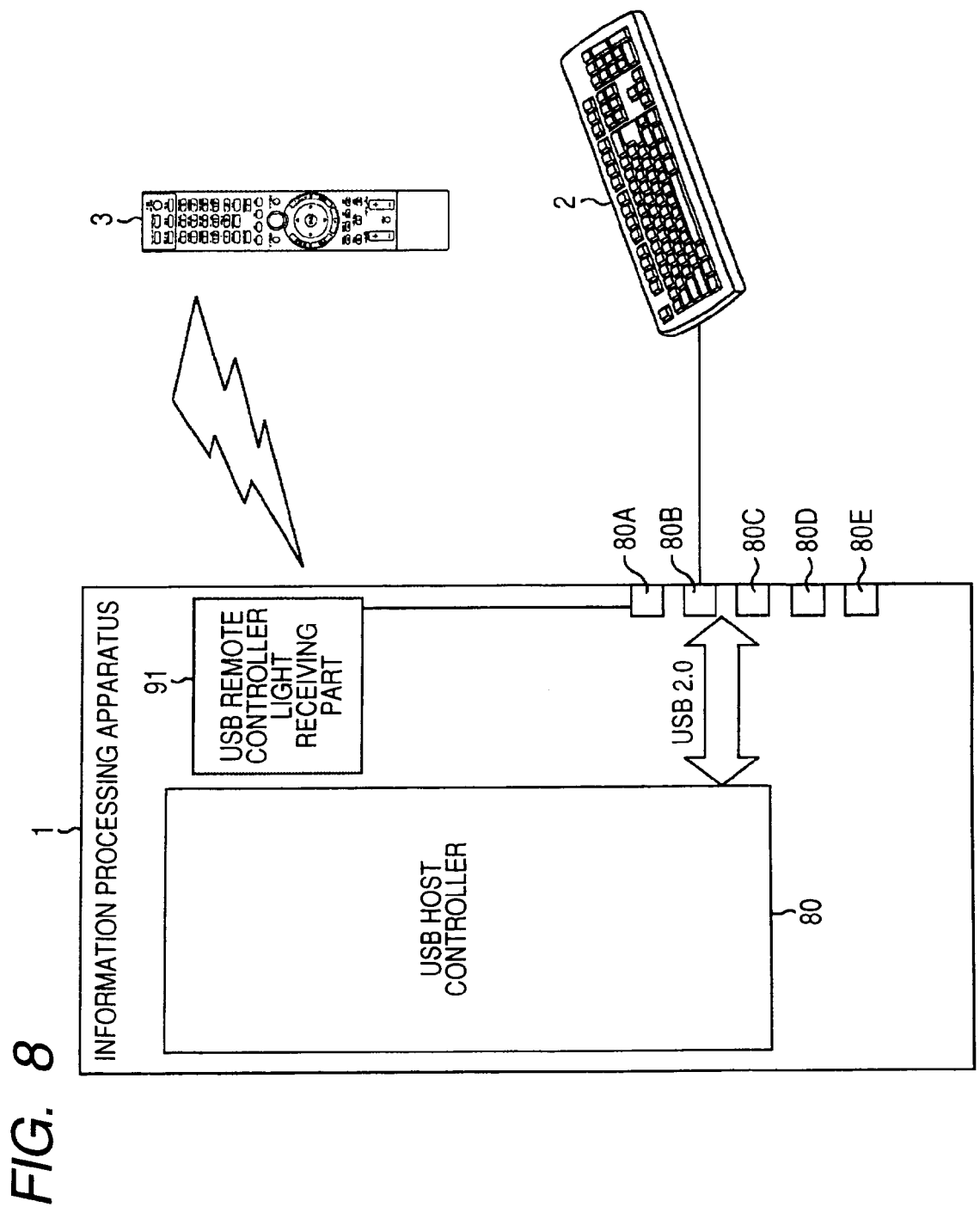
FIG. 8 shows a diagram depicting exemplary USB devices connected to a USB host controller.

FIG. 8 shows a diagram depicting exemplary USB devices connected to the USB host controller 80.

In the example shown in FIG. 8, to the USB host controller 80, USB terminals 80A to 80E are connected through a USB 2.0 interface. To the USB terminal 80A, a USB remote controller light receiving part 91 is connected, and to the USB terminal 80B, the keyboard 2 is connected. The USB remote controller light receiving part 91 receives infrared rays outputted from the remote controller 3, and outputs a signal indicating a user manipulation to the USB host controller 80.

As described above, in the information processing apparatus, the light receiving part is provided as a USB device, which receives signals from the remote controller 3. The signals from the USB remote controller light receiving part 91 and the signals from the keyboard 2 are received in the USB host controller 80, and the signals are acquired by the driver that is a software module, and supplied to the application that detects a user manipulation through the driver.

Figure 9:
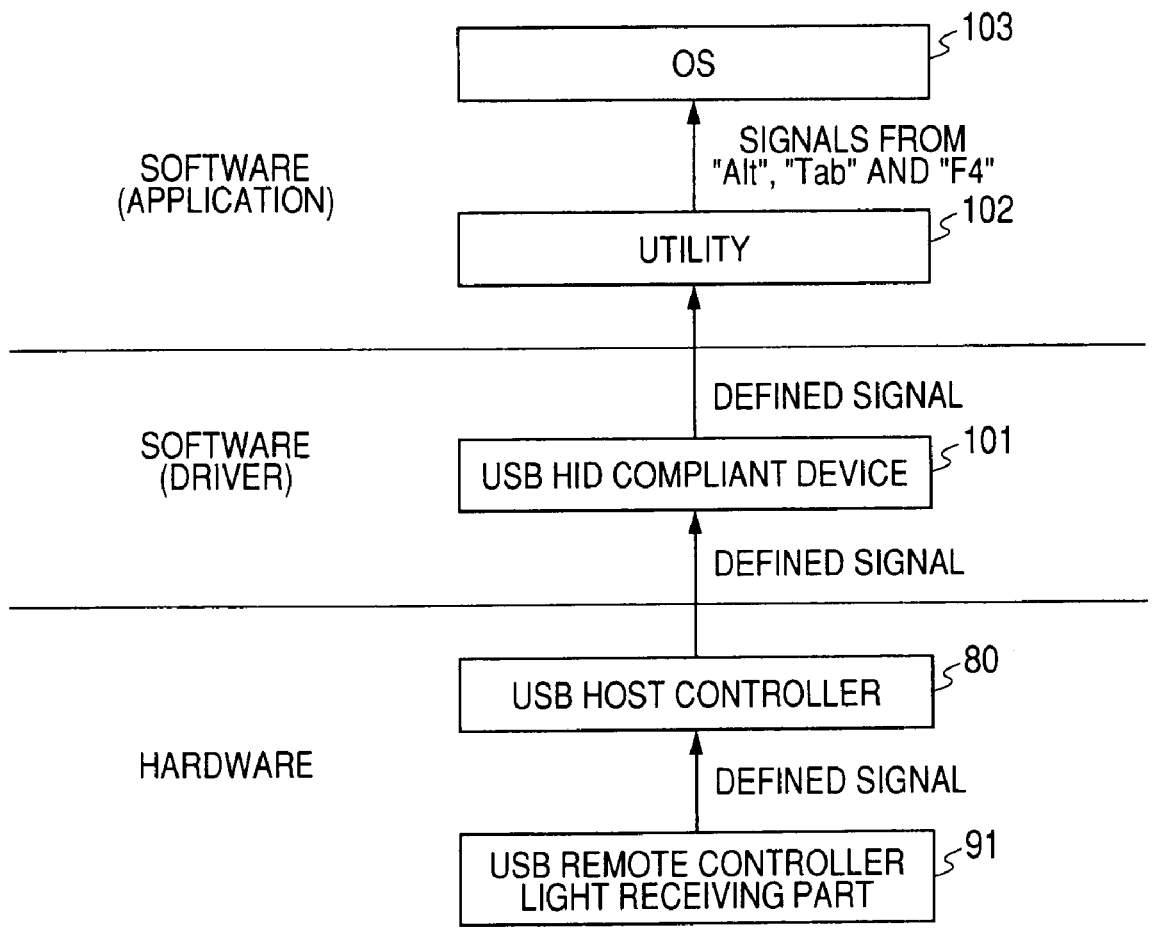
FIG. 9 shows a diagram depicting an exemplary stack of modules provided in the information processing apparatus.

FIG. 9 shows a diagram depicting an exemplary stack of modules provided in the information processing apparatus 1.

The USB remote controller light receiving part 91 receives infrared rays outputted from the remote controller 3, and outputs to the USB host controller 80 a signal (a code) that is defined to indicate a button pressed by a user in response to the reception.

In accordance with the signals supplied from the USB remote controller light receiving part 91, the USB host controller 80 outputs to a USB HID (Human Interface Device) compliant device 101 of the driver a signal defined to indicate a button on the remote controller 3 pressed by a user.

The USB HID compliant device 101 outputs to a utility 102 of upper level software a signal defined to indicate a button on the remote controller 3 pressed by a user.

The utility 102 converts the signals supplied from the USB HID compliant device 101 into the signals that an OS can recognize, such as the signal indicating that the Alt key is pressed, the signal indicating that the Tab key is pressed, and the signal indicating that the F4 key of the function keys is pressed, in accordance with the state of the screen shown on the display, and outputs the converted signals to notify an OS 103 of the detail of the user manipulation. The utility 102 is an application that detects user manipulations and notifies the OS of the detail of the user manipulations.

In accordance with the notification from the utility 102, the OS 103 performs processes such as switching the representation on the display 76.

Figure 10:
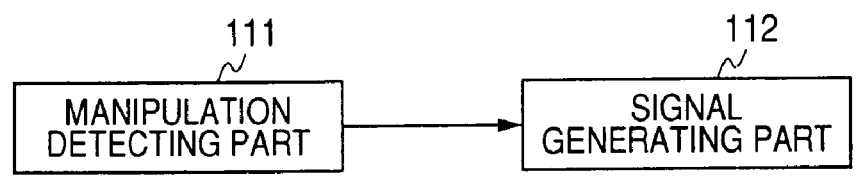
FIG. 10 shows a block diagram depicting an exemplary functional configuration of the information processing apparatus.

FIG. 10 shows a block diagram depicting an exemplary functional configuration of the information processing apparatus 1. At least a part of the functional blocks shown in FIG. 10 is implemented by executing the utility 102 shown in FIG. 9 by the CPU 71 (FIG. 7).

As shown in FIG. 10, in the information processing apparatus 1, a manipulation detecting part 111 and a signal generating part 112 are implemented.

The manipulation detecting part 111 detects a user manipulation to the buttons provided on the remote controller 3 based on the signal outputted from the USB remote controller light receiving part 91 and supplied through the USB host controller 80 and the USB HID compliant device 101, and notifies the signal generating part 112 of the detected manipulation.

In the case in which the signal generating part 112 is notified of the user manipulation from the manipulation detecting part 111, the signal generating part 112 determines the state of the representation on the display 76 when the button on the remote controller 3 is manipulated, and generates the signal that the OS 103 can recognize such as the signal indicating that the Alt key is pressed, the signal indicating that the Tab key is pressed, and the signal indicating that the F4 key of the function keys is pressed, in accordance with the determined state. The signal generating part 112 outputs the generated signal to the OS 103, and notifies the detail of the user manipulation.

Here, the processes of the information processing apparatus 1 having the configurations above will be described.

Figure 11:
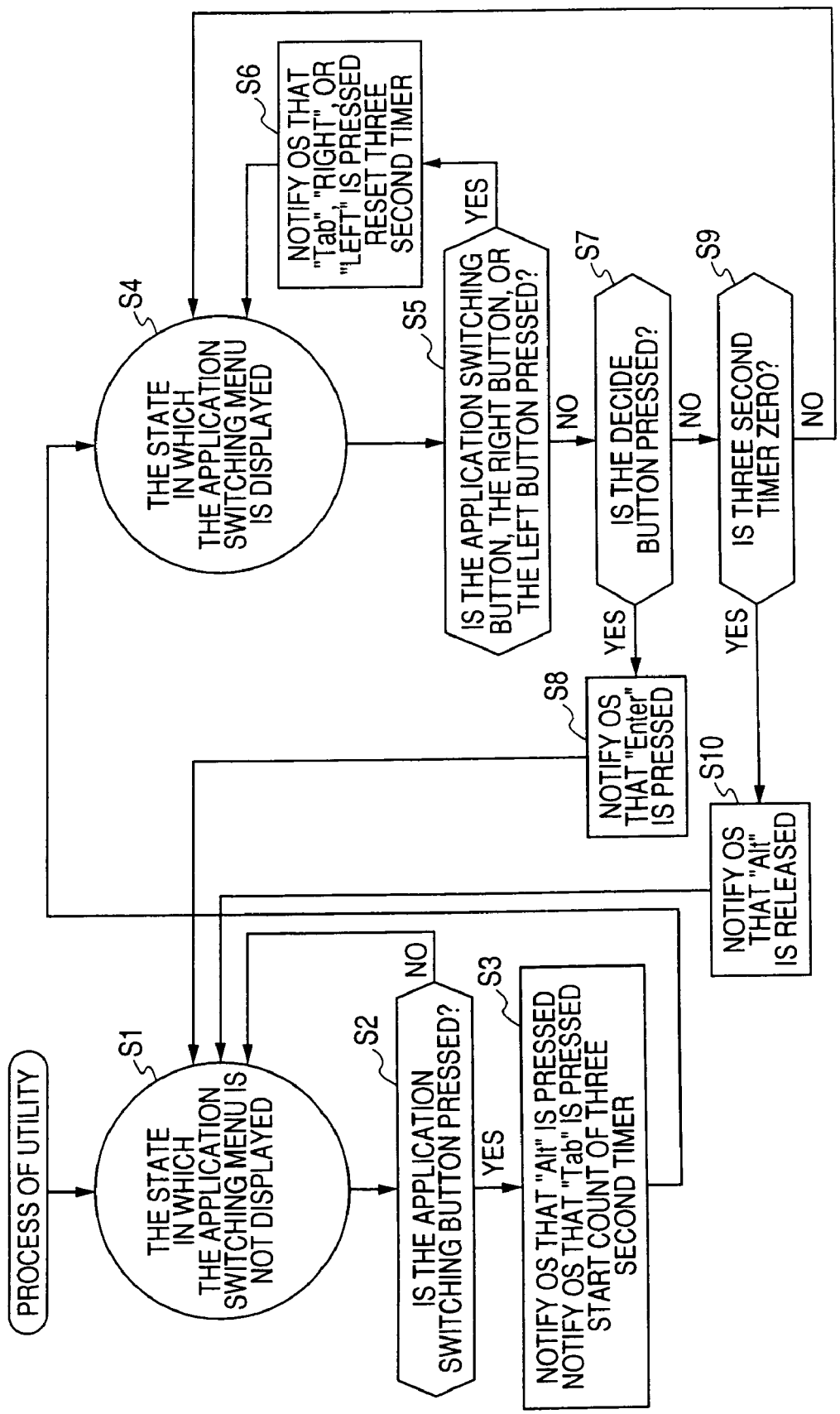
FIG. 11 shows a flow chart illustrative of a process done by a utility.

First, the process done by the utility 102 will be described with reference to a flow chart shown in FIG. 11.

The process is started in the state of Step S1 in which the application switching menu 41 is not shown on the display 76. In Step S1, for example, the state of the display 76 is turned into the state shown in FIG. 3 in which the screen is displayed.

In Step S2, the manipulation detecting part 111 implemented by the utility 102 determines whether the application switching button 11 provided on the remote controller 3 is pressed based on a signal that is received in the USB remote controller light receiving part 91 and supplied through the USB host controller 80 and the USB HID compliant device 101.

In Step S2, the manipulation detecting part 111 waits until it determines that the application switching button 11 is pressed.

In Step S2, if the manipulation detecting part 111 determines that the application switching button 11 is pressed, in Step S3, the signal generating part 112 generates the signal indicating that the Alt key is pressed and the signal indicating that the Tab key is pressed in response to the notification from the manipulation detecting part 111, outputs the signals to the OS 103, and notifies the OS 103 that the Alt key and the Tab key are pressed at the same time. In addition, the signal generating part 112 starts counting of a three second timer. The time period three seconds is a time period that the representation of the application switching menu 41 is deleted after three seconds have elapsed in the case in which a user makes no manipulations.

In response to the notification from the signal generating part 112, the OS 103 shows the application switching menu 41, and the state of the display 76 is turned into the state in Step S4. Until the OS 103 is notified that the Alt key is released, the OS 103 recognizes that the Alt key is kept pressed.

In Step S5, the manipulation detecting part 111 determines whether any one of the application switching button 11, the left button 13C and the right button 13D provided on the remote controller 3 is pressed based on the signal that is received in the USB remote controller light receiving part 91 and supplied through the USB host controller 80 and the USB HID compliant device 101.

In Step S5, if the manipulation detecting part 111 determines that any one of the buttons is pressed, in Step S6, the signal generating part 112 generates and outputs the signal indicating that the Tab key, the left key, or the right key provided on the keyboard 2 is pressed for one time in response to the notification from the manipulation detecting part 111, and then the signal generating part 112 notifies the OS 103 that the manipulation is made. In addition, the signal generating part 112 resets the three second timer, and then again starts measuring.

Since the OS 103 recognizes that the Alt key is kept pressed, in response to the notification that the Tab key is pressed for one time or that the right key is pressed for one time, the OS 103 displays the position of the cursor 41C as moved in the right direction by one icon. In addition, in response to the notification that the left key is pressed for one time, the OS 103 displays the position of the cursor 41C as moved in the left direction by one icon.

In Step S6, after the OS 103 is notified that the Tab key, the left key, or the right key provided on the keyboard 2 is pressed for one time, the process returns to Step S4, and the process steps after that are performed.

On the other hand, in Step S5, when it is determined that none of the application switching button 11, the left button 13C and the right button 13D is pressed, in Step S7, the manipulation detecting part 111 determines whether the decide button 14 provided on the remote controller 3 is pressed based on the signal that is received in the USB remote controller light receiving part 91 and supplied through the USB host controller 80 and the USB HID compliant device 101.

In Step S7, if the manipulation detecting part 111 determines that the decide button 14 is pressed, in Step S8, the signal generating part 112 generates and outputs the signal indicating that the Enter key provided on the keyboard 2 is pressed in response to the notification from the manipulation detecting part 111, and then the signal generating part 112 notifies the OS 103 that the manipulation is made. In addition, the signal generating part 112 finishes measuring the timer.

Since the OS 103 recognizes that the Alt key is kept pressed, in response to the notification that the Enter key is pressed for one time, the OS 103 deletes the representation of the application switching menu 41 to switch the representation so that the window indicated by the icon selected by the cursor 41C is turned into the active state.

In Step S8, after it is notified that the Enter key is pressed, the process returns to Step S1, and the process steps after that are performed.

On the other hand, in Step S7, if the manipulation detecting part 111 determines that the decide button 14 is not pressed, in Step S9, the signal generating part 112 determines whether the remaining time period of the three second timer reaches zero.

In Step S9, if the signal generating part 112 determines that the remaining time period does not reach zero, the process returns to Step S4, and the process steps after that are performed.

On the other hand, in Step S9, if the signal generating part 112 determines that the remaining time period reaches zero, in Step S10, the signal generating part 112 generates and outputs the signal indicating that the Alt key is released, and notifies the OS 103 that the manipulation is made.

Since the OS 103 recognizes that the Alt key is kept pressed, in response to the notification that the Alt key is released, the OS 103 deletes the representation of the application switching menu 41. After that, the process returns to Step S1, and the process steps after that are performed.

As described above, in the information processing apparatus 1, when the state is continued for a predetermined time period in which no manipulations are made after the application switching menu 41 is shown, the representation of the menu is to be deleted.

Figure 12:
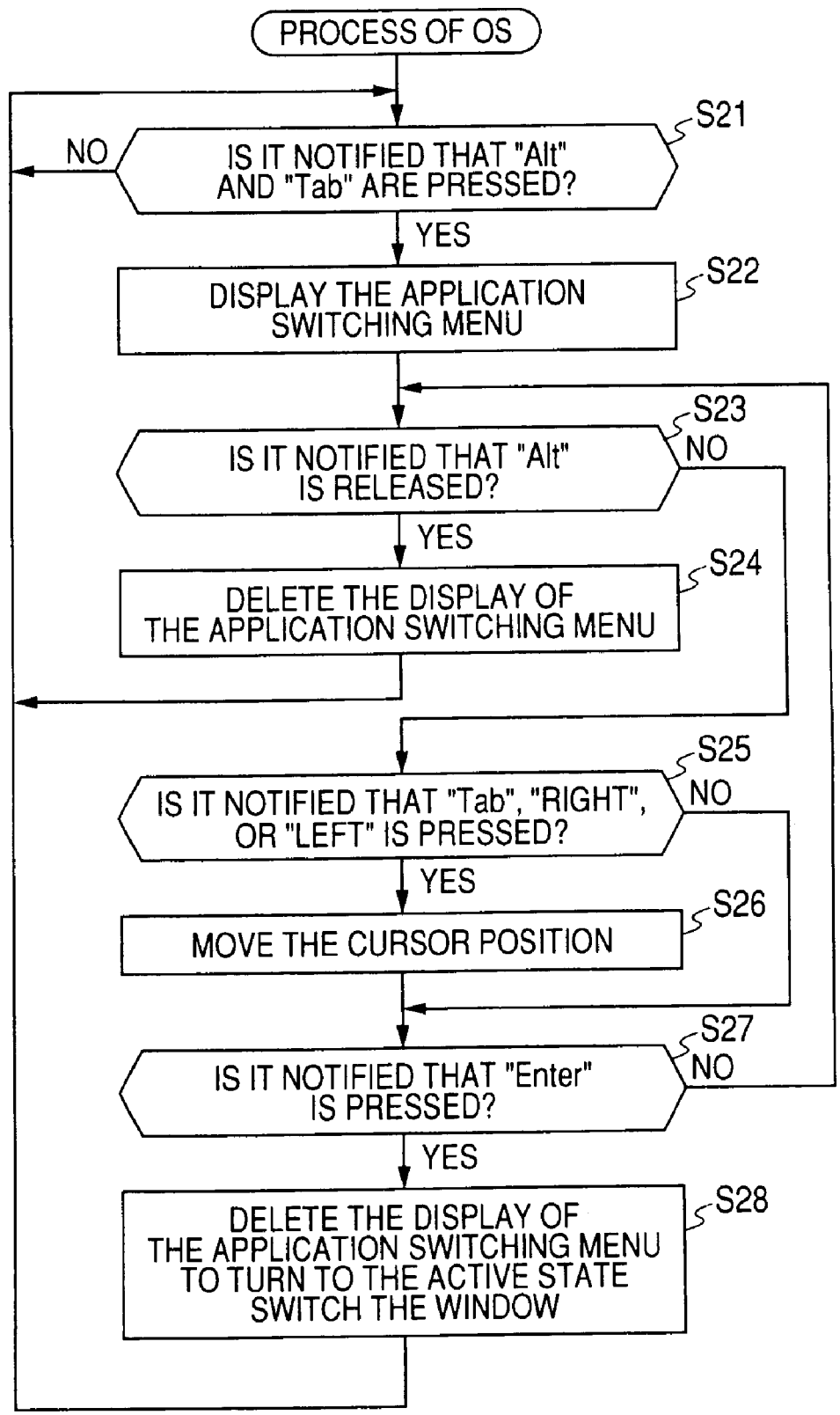
FIG. 12 shows a flow chart illustrative of a process done by an OS.

Next, the process done by the OS 103 that is performed as corresponding to the process shown in FIG. 11 will be described with reference to a flow chart shown in FIG. 12. The process is also started in the state in which the application switching menu 41 is not shown.

In Step S21, if the OS 103 determines whether the signal generating part 112 notifies that the Alt key and the Tab key are pressed at the same time, and waits until the OS 103 determines that the notification is made.

In Step S21, if the OS 103 determines that it is notified that the Alt key and the Tab key are pressed at the same time, in Step S22, the OS 103 shows the application switching menu 41 on the display 76.

In Step S23, the OS 103 determines whether the signal generating part 112 notifies that the Alt key is released.

In Step S23, if the OS 103 determines that it is notified that the Alt key is released, in Step S24, the OS 103 deletes the representation of the application switching menu 41. After that, the process returns to Step S21, and the process steps after that are performed.

On the other hand, in Step S23, if the OS 103 determines that it is not notified that the Alt key is released, in Step S25, the OS 103 determines whether the signal generating part 112 notifies that any one of the Tab key, the left key, and the right key is pressed.

In Step S25, if the OS 103 determines that it is notified that any one of the Tab key, the left key, and the right key is pressed, in Step S26, the OS 103 moves and displays the position of the cursor 41C. In Step S25, if the OS 103 determines that it is not notified that any one of the Tab key, the left key, and the right key is pressed, the process in Step S26 is skipped.

In Step S27, the OS 103 determines whether the signal generating part 112 notifies that the Enter key is pressed. In Step S27, if the OS 103 determines that it is not notified that the Enter key is pressed, the process returns to Step S23, and the process steps after that are performed.

On the other hand, in Step S27, if the OS 103 determines that it is notified that the Enter key is pressed, in Step S28, the OS 103 deletes the representation of the application switching menu 41, and switches the representation on the display 76 so that the window indicated by the icon selected by the cursor 41C is turned into the active state. After that, the process returns to Step S21, and the process steps after that are performed.

As discussed above, the details notified to the OS 103 are changed depending on the state of the representation on the display 76 when the application switching button 11 is pressed, whereby a user uses a single one of the buttons provided on the remote controller 3 to perform a plurality of manipulations the same as the manipulations done by using the keyboard 2.

Figure 13:
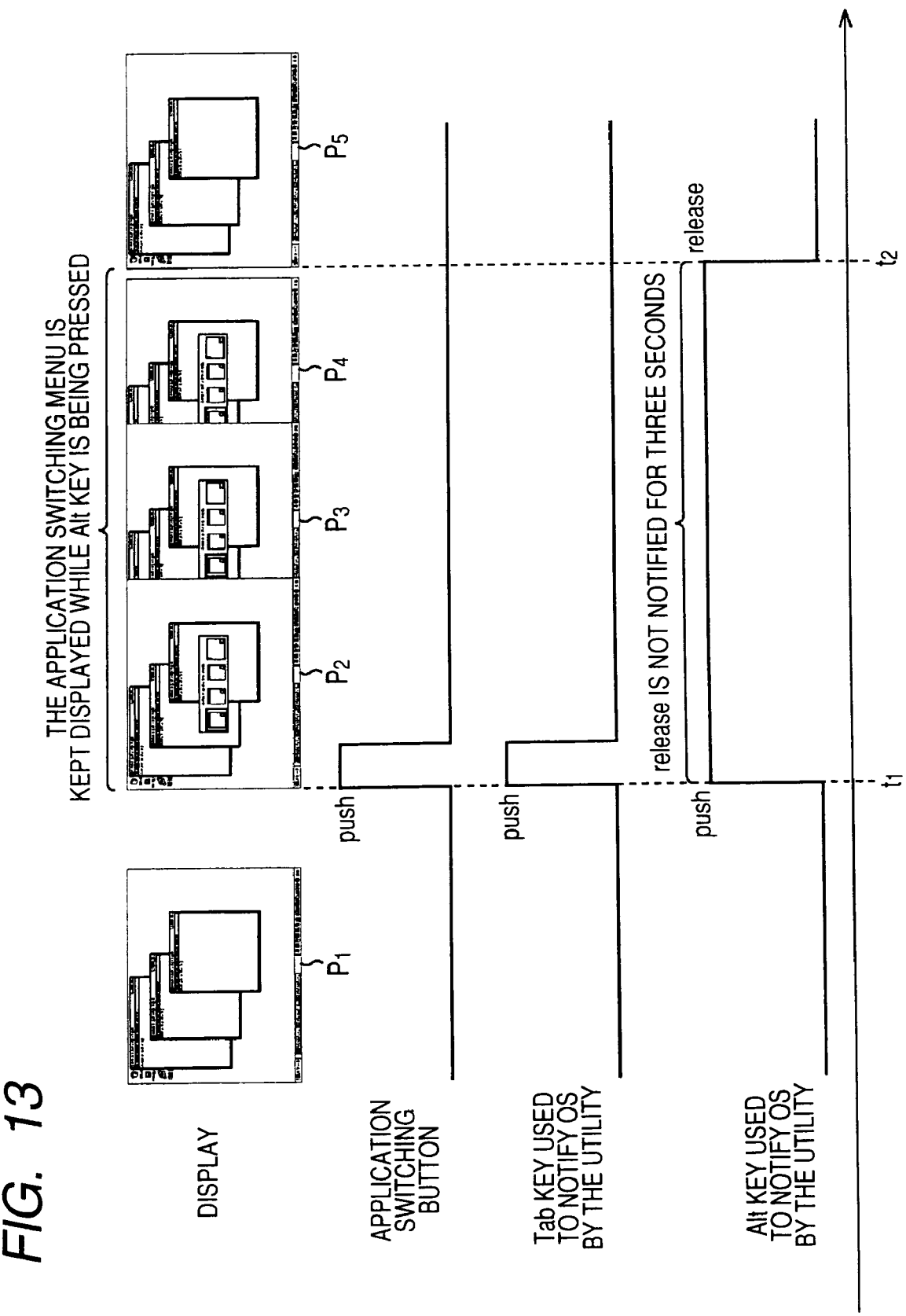
FIG. 13 shows a diagram depicting exemplary timings of switching the display.

FIG. 13 shows a diagram depicting exemplary timings to switch the representation implemented by the process steps described above.

In FIG. 13, the horizontal axis shows the time instant. A screen $P_1$ shown in the upper part of FIG. 13 depicts the screen in FIG. 3 on which the application switching menu 41 is not displayed, and screens $P_2$ to $P_4$ depict the screens in FIG. 4 on which the application switching menu 41 is shown. A screen $P_5$ depicts the screen in FIG. 3 on which the application switching menu 41 is not displayed.

For example, when the application switching button 11 provided on the remote controller 3 is pressed at a time instant $t_1$, the utility 102 notifies the OS 103 that the Tab key and the Alt key are pressed at the same time.

In response to the notification, instead of the screen $P_1$ on which the application switching menu 41 is not displayed, the screen $P_2$ on which the application switching menu 41 is shown is displayed on the display 76. In response to pressing the application switching button 11, measuring the timer is started. During the time period three seconds for which the remaining time period reaches zero, the utility 102 does not notify the OS 103 that the Alt key is released, and the screens on which the application switching menu 41 is shown such as the screens $P_3$ and $P_4$ are continuously displayed even though a user does not make any one of manipulations.

At a time instant $t_2$ after the time period three seconds have elapsed from the time instant $t_1$, the representation on the display 76 is switched to the screen $P_5$ into the state in which the application switching menu 41 is not displayed.

For example, in the case in which a user presses the application switching button 11 provided on the remote controller 3 for one time but the user does not make any one of further manipulations, the representation on the display 76 is switched as described above.

In the discussion above, it is described that the information processing apparatus 1 has a similar form as a typical television receiver. However, as shown in FIG. 14, the information processing apparatus 1 may be implemented as an apparatus having a cabinet separated from a television receiver.

Figure 14:
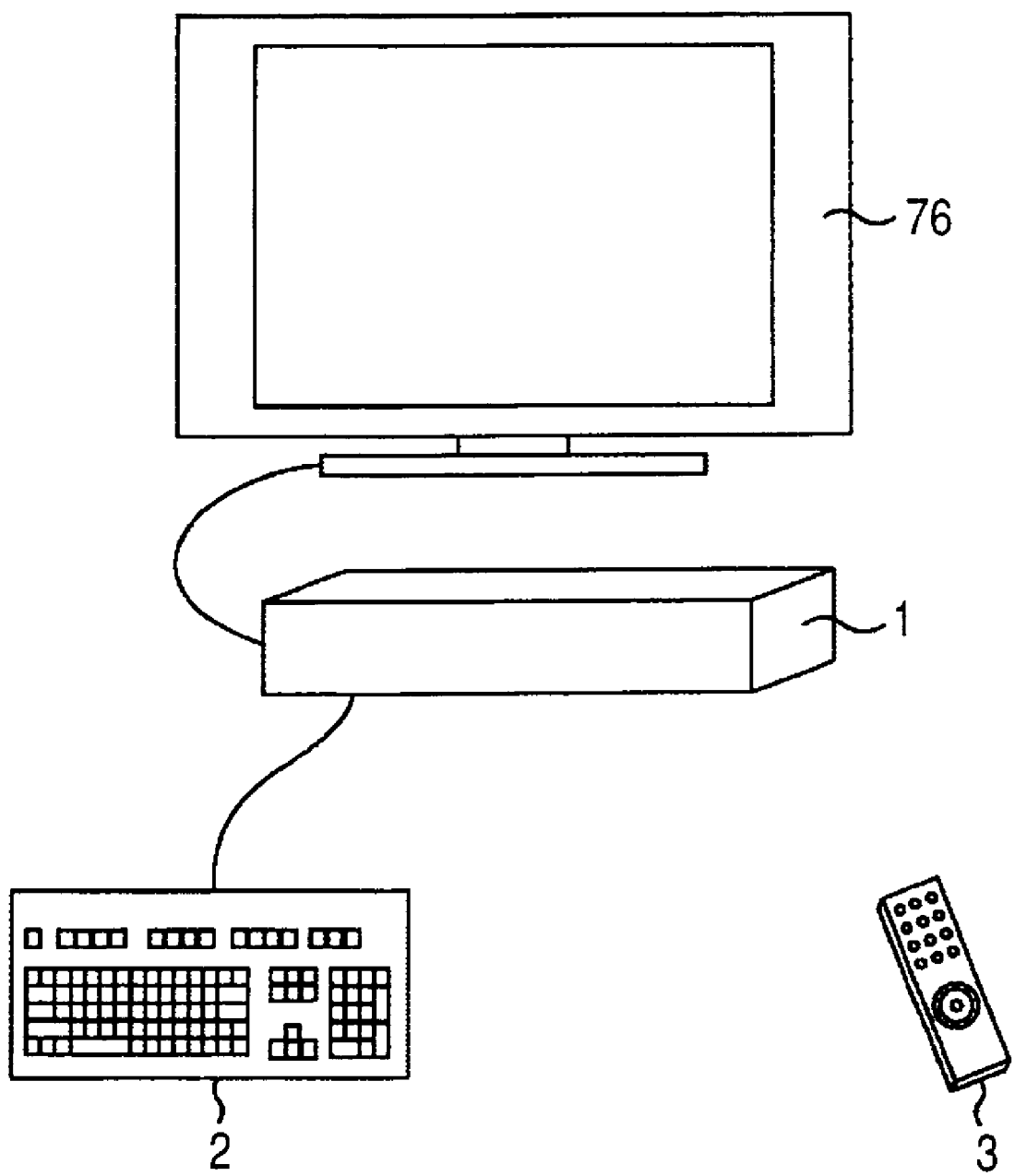
FIG. 14 shows a diagram depicting another information processing apparatus.

In the example shown in FIG. 14, an information processing apparatus 1 is connected to a display 76 through a cable, in which the representation on the display 76 is controlled by the information processing apparatus 1 in the manner as described above. The information processing apparatus 1 has an OS installed therein and a keyboard 2 connected thereto as well as a light receiving part that receives signals from a remote controller 3.

In addition, this scheme may be possible that depending on the OS installed in the information processing apparatus 1, signals to be outputted from the utility 102 to the OS 103 are changed.

For example, it is described that when the left button 13C or the right button 13D provided on the remote controller 3 is pressed in the state in which the application switching menu 41 is shown, the utility 102 outputs to the OS 103 the signal indicating that the left key or the right key on the keyboard 2 is pressed. However, this scheme may be possible that when the left button 13C on the remote controller 3 is pressed, such a signal is outputted, the signal indicating that the Tab key is pressed while the Shift key on the keyboard 2 is being pressed, and when the right button 13D is pressed, such a signal is outputted, the signal indicating that the Tab key on the keyboard 2 is pressed.

A series of the process steps described above may be executed by hardware, or may be executed by software. In the case in which a series of the process steps is executed by software, a program configuring the software is installed in a computer incorporated in a dedicated hardware, or is installed from a program recording medium to a multi-purpose personal computer, for example, that can run various functions by installing various programs. For example, the program executed by the computer is provided by being recorded on a removable medium 83 formed of an optical disk, or through wire or radio transmission media such as a local area network, the Internet, and digital satellite broadcasting.

Then, the removable medium 83 is mounted on a drive 82 to install the program on a hard disk 78 through an input/output interface 75. In addition, the program can be received in a communicating part 79 through wire or radio transmission media installed in the hard disk 78.

Moreover, the program executed by the computer may be a program in which the process steps are done in a time series in the order described in the specification, or may be done in parallel, or may be a program in which the process steps are done at timings as necessary such as the timing invoked.

Embodiments of the invention are not restricted to the embodiments described above, which can be modified variously within the scope of the teachings of the embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that allows a display to show a plurality of windows on a same screen, the information processing apparatus comprising:

a detecting means for detecting a signal sent in response to a press of a button allocated on a remote controller;

a control means for outputting to an operating system a signal indicating that a first key and a second key provided on a keyboard are pressed and allowing the operating system to switch a representation on the display when the detecting means detects that only a first button provided on the remote controller is pressed in accordance with a state of the representation on the display; and a measuring means for measuring a time period from the detection of a signal corresponding to the press of the first button, wherein the control means continuously outputs to the operating system a signal indicating that only the first key is kept pressed for a predetermined time period after the signal corresponding to the press of the first button is detected, and the control means outputs a signal indicating that the second key is pressed while the first key is kept pressed when a signal corresponding to a press of the first button is again detected within the predetermined time period.

2. The information process apparatus according to claim 1, wherein the control means outputs a signal indicating that the first key is released when a signal from the remote controller is not detected within the predetermined time period.

3. The information process apparatus according to claim 1, wherein the control means outputs to the operating system a signal indicating that an Alt key and a Tab key provided on the keyboard are pressed when the detecting means detects that the first button is pressed.

4. The information process apparatus according to claim 1, wherein the control means outputs a signal that moves a cursor in a menu to select an active window when a signal corresponding to a press of a second button provided on the remote controller is detected within the predetermined time period.

5. The information process apparatus according to claim 1, wherein the control means outputs a signal that determines an item in a menu to select an active window when a signal corresponding to a press of a third button provided on the remote controller is detected within the predetermined time period.

6. The information process apparatus according to claim 1, wherein the control means outputs to the operating system a signal indicating that the Alt key and a F4 key of function keys provided on the keyboard are pressed to finish a window displayed on the frontmost side when a signal corresponding to a press of a fourth button provided on the remote controller is detected within the predetermined time period.

7. An information processing method of switching to an active window from a plurality of windows, the method comprising:

detecting a signal sent in response to a press of a button allocated on a remote controller;

outputting to an operating system a signal indicating that a first key and a second key provided on a keyboard are pressed and allowing the operating system to switch a representation on a display in accordance with a state of the representation on the display when it is detected that only a first button provided on the remote controller is pressed;

measuring a time period from the detection of a signal corresponding to the press of the first button;

continuously outputting to the operating system a signal indicating that only the first key is kept pressed for a predetermined time period after the signal corresponding to the press of the first button is detected; and outputting a signal indicating that the second key is pressed while the first key is kept pressed when a signal corresponding to a press of the first button is again detected within the predetermined time period.

8. The information processing method according to claim 7, further comprising:

outputting a signal indicating that the first key is released when a signal from the remote controller is not detected within the predetermined time period.

9. A non-transitory computer-readable medium including a program, which when executed by a computer, causes the computer to execute a process comprising:

detecting a signal sent in response to a press of a button allocated on a remote controller;

outputting to an operating system a signal indicating that a first key and a second key provided on a keyboard are pressed and allowing the operating system to switch a representation on a display in accordance with a state of the representation on the display when it is detected that only a first button provided on the remote controller is pressed; and measuring a time period from the detection of a signal corresponding to the press of the first button;

continuously outputting to the operating system a signal indicating that only the first key is kept pressed for a predetermined time period after the signal corresponding to the press of the first button is detected; and outputting a signal indicating that the second key is pressed while the first key is kept pressed when a signal corresponding to a press of the first button is again detected within the predetermined time period.

10. The non-transitory computer-readable medium according to claim 9, further comprising:

outputting a signal indicating that the first key is released when a signal from the remote controller is not detected within the predetermined time period.

11. An information processing apparatus that allows a display to show a plurality of windows on a same screen, the information processing apparatus comprising:

a detecting unit configured to detect a signal sent in response to a press of a button allocated on a remote controller;

a control unit configured to output to an operating system a signal indicating that a first key and a second key provided on a keyboard are pressed and to allow the operating system to switch a representation of display when the detecting unit detects that only a first button provided on the remote controller is pressed in accordance with a state of the representation on the display; and a measuring unit configured to measure a time period from the detection of a signal corresponding to the press of the first button, wherein the control unit is configured to continuously output to the operating system a signal indicating that indicating that the only first key is kept pressed for a predetermined time period after the signal corresponding to the press of the first button is detected, and the control unit is configured to output a signal indicating that the second key is pressed while the first key is kept pressed when a signal corresponding to a press of the first button is again detected within the predetermined time period.

* * * * *